(No Model.)

L. F. BROWN.
BRIDLE BIT.

No. 484,994. Patented Oct. 25, 1892.

WITNESSES
F. L. Ourand
G. M. Copenhaver.

INVENTOR
Lincoln F. Brown,
by Finckel & Finckel
Attorneys

UNITED STATES PATENT OFFICE.

LINCOLN F. BROWN, OF XENIA, OHIO.

BRIDLE-BIT.

SPECIFICATION forming part of Letters Patent No. 484,994, dated October 25, 1892.

Application filed June 29, 1892. Serial No. 438,369. (No model.)

*To all whom it may concern:*

Be it known that I, LINCOLN F. BROWN, a citizen of the United States, residing at Xenia, in the county of Greene and State of Ohio, have invented certain new and useful Improvements in Curb-Bits; and I do hereby declare the following to be a full, clear, and exact description of the invention, such as will enable others skilled in the art to which it appertains to make and use the same.

The object of my invention is to provide a bit adapted effectually to check a runaway horse.

My invention resides chiefly in a mouth-bar furnished with a feather or gag plate with long lever-arms, to which the reins are attached, and snap-loops, so that by pulling on the reins with unusual force will cause the plate or feather on the mouth-bar to pinch the animal's tongue or otherwise hurt his mouth and render his running away painful.

My invention also consists in certain details incidental to the construction thus briefly outlined, all of which will now be fully disclosed.

Figure 1:
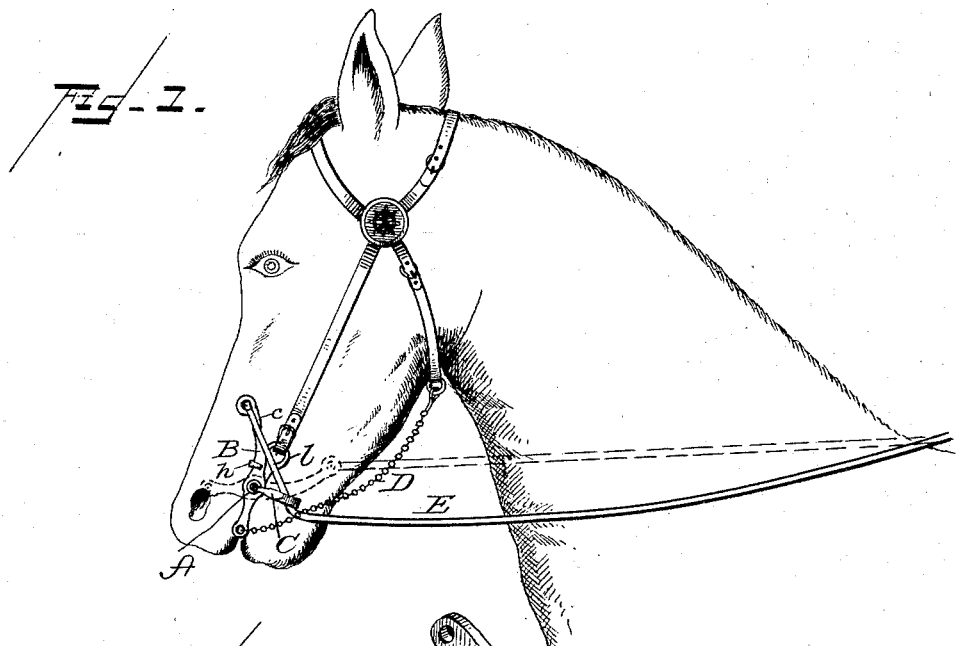
Figure 2:
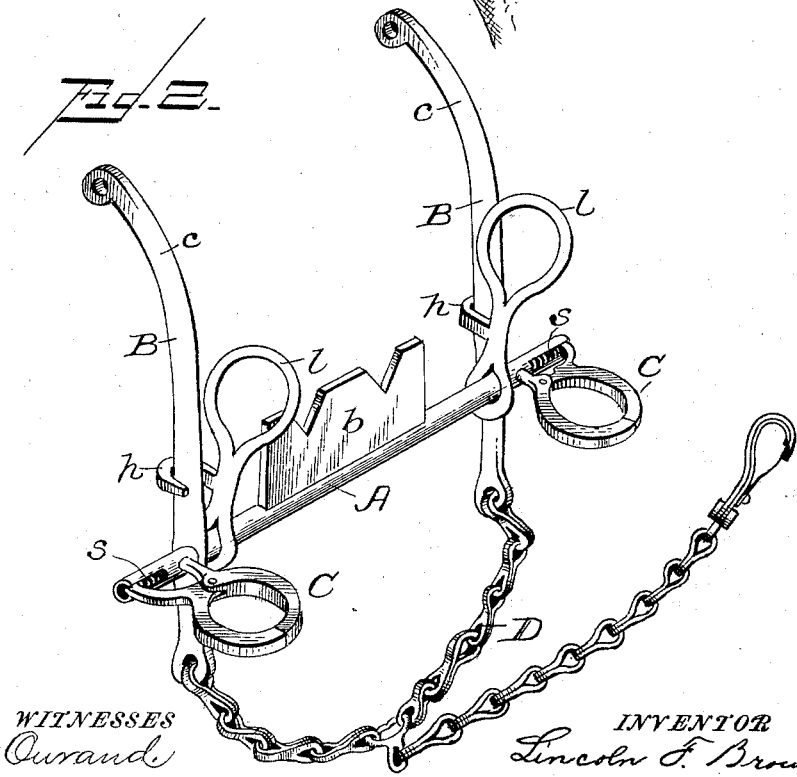

In the accompanying drawings, Figure 1 represents a side view of a horse's head and bridle, with my invention applied thereto; and Fig. 2 is an enlarged perspective.

The letter A designates the mouth-bar, which is provided with a feather or plate $b$, the edge of which may be notched to render its action more effective.

Rigidly connected with the mouth-bar are the levers B, which lie along the cheeks of the animal. The upper arms $c$ of these levers are comparatively long, so that a powerful purchase may be had on the gag-plate $b$. The ends of the mouth-bar are shown to be tubular, and carry coiled springs $s$ that act on the movable parts of snap-loops C.

The bit is secured on the horse's head by means of the usual side straps which are connected with the mouth-bar by rings or loops $l$, in which the said mouth-bar readily turns. Hooks $h$ on the rings or loops $l$ catch loosely around the front edge of the levers B and prevent the latter from falling forward. A chain D is connected with the lower lever-arms $c'$ and with the strap under the throat of the animal. The reins E are connected with the upper ends of the levers B and passed through the snap-loops C back to the driver. When the animal is quiescent, the gag-plate lies flat upon his tongue and causes him no discomfort; but when he becomes turbulent or unruly and seeks to run away the reins are pulled from the snap-loops C and the gag-plate brought down upon his tongue with a force sufficient to pinch it severely and render his efforts painful. When the upper ends of the levers are being pulled down, the chain D, connecting their lower ends with the throat-strap, serves as a fulcrum and enables the driver to bring a strong squeezing pressure on the tongue and lower jaw of the animal.

What I claim as my invention, and desire to secure by Letters Patent, is—

1. In a bridle or curb bit, a mouth-bar provided with a gag-plate, the levers B B, connected with the mouth-bar and adapted to be operated by the reins to turn the bar, and snap-loops C C, located, substantially, in line with the bar and the direction of pull, and also constructed to receive the reins and to permit their release upon the application of unusual force to the reins, substantially as shown and described.

2. A bridle or curb bit having a mouth-bar, cheek levers or arms B, and rings or loops $l$, loose on the mouth-bar and having hooks $h$ to engage the levers B, substantially as shown and described.

In testimony whereof I affix my signature in presence of two witnesses.

LINCOLN F. BROWN.

Witnesses:
HENRY EWING,
JOHN JAY KNOX.